(12) United States Patent
Brechemier et al.

(10) Patent No.: US 9,751,184 B2
(45) Date of Patent: Sep. 5, 2017

(54) OPHTHALMIC-LENS HOLDER

(75) Inventors: Bernard Brechemier, Charenton le Pont (FR); Stephane Boutinon, Charenton le Pont (FR); David Tang, Charenton le Pont (FR)

(73) Assignee: ESSILOR INTERNATIONAL, Charenton le Pont (FR)

( * ) Notice: Subject to any disclaimer, the term of this patent is extended or adjusted under 35 U.S.C. 154(b) by 371 days.

(21) Appl. No.: 14/112,114

(22) PCT Filed: Mar. 8, 2012

(86) PCT No.: PCT/FR2012/000082
§ 371 (c)(1),
(2), (4) Date: Oct. 16, 2013

(87) PCT Pub. No.: WO2012/143621
PCT Pub. Date: Oct. 26, 2012

(65) Prior Publication Data
US 2014/0038500 A1 Feb. 6, 2014

(30) Foreign Application Priority Data

Apr. 21, 2011 (FR) ...................... 11 01266

(51) Int. Cl.
*B24B 13/005* (2006.01)
*B24B 9/14* (2006.01)
*G02B 7/02* (2006.01)
*G02C 13/00* (2006.01)

(52) U.S. Cl.
CPC ............ *B24B 13/005* (2013.01); *B24B 9/146* (2013.01); *B24B 13/0055* (2013.01); *G02B 7/023* (2013.01); *G02C 13/005* (2013.01)

(58) Field of Classification Search
CPC .......... B24B 313/005; B24B 313/0055; B24B 313/0052; B24B 9/146; B24B 37/30; G02B 7/023; B23Q 3/186
USPC ................................. 451/384, 389, 385, 398
See application file for complete search history.

(56) References Cited

U.S. PATENT DOCUMENTS

| 1,134,938 | A | * | 4/1915 | Bader ................. B24B 13/0055 |
| | | | | 33/507 |
| 3,858,982 | A | * | 1/1975 | Meckler ................ B24B 13/005 |
| | | | | 356/127 |
| 4,229,911 | A | * | 10/1980 | Bicskei ................. B24B 13/005 |
| | | | | 33/507 |
| 4,938,489 | A | * | 7/1990 | Nemirovsky ....... B23B 31/1261 |
| | | | | 269/156 |

(Continued)

FOREIGN PATENT DOCUMENTS

| DE | 87 09 003 U1 | 8/1987 |
| FR | 2 861 005 A1 | 4/2005 |

OTHER PUBLICATIONS

International Search Report, dated Jul. 19, 2012, from corresponding PCT application.

*Primary Examiner* — Monica Carter
*Assistant Examiner* — Marcel Dion
(74) *Attorney, Agent, or Firm* — Young & Thompson

(57) ABSTRACT

An ophthalmic-lens holder (200) includes a plate (210) and three pads (250) which are mounted on the plate and rise up above the latter to offer free ends (271) via which they can bear the ophthalmic lens. At least one of the three pads is movably mounted on the plate.

14 Claims, 3 Drawing Sheets

(56) References Cited

U.S. PATENT DOCUMENTS

| | | | | |
|---|---|---|---|---|
| 6,111,706 | A * | 8/2000 | Incera | B24B 13/005 |
| | | | | 359/811 |
| 7,530,690 | B2 * | 5/2009 | Divo | B24B 9/146 |
| | | | | 351/159.8 |
| 2004/0061847 | A1 * | 4/2004 | Nakamura | G01M 11/0207 |
| | | | | 356/124 |
| 2007/0091262 | A1 * | 4/2007 | Watanabe | G02C 13/003 |
| | | | | 351/178 |
| 2007/0226991 | A1 * | 10/2007 | Matsuyama | B24B 9/146 |
| | | | | 29/700 |
| 2007/0232194 | A1 * | 10/2007 | Matsuyama | A61B 5/0408 |
| | | | | 451/5 |

* cited by examiner

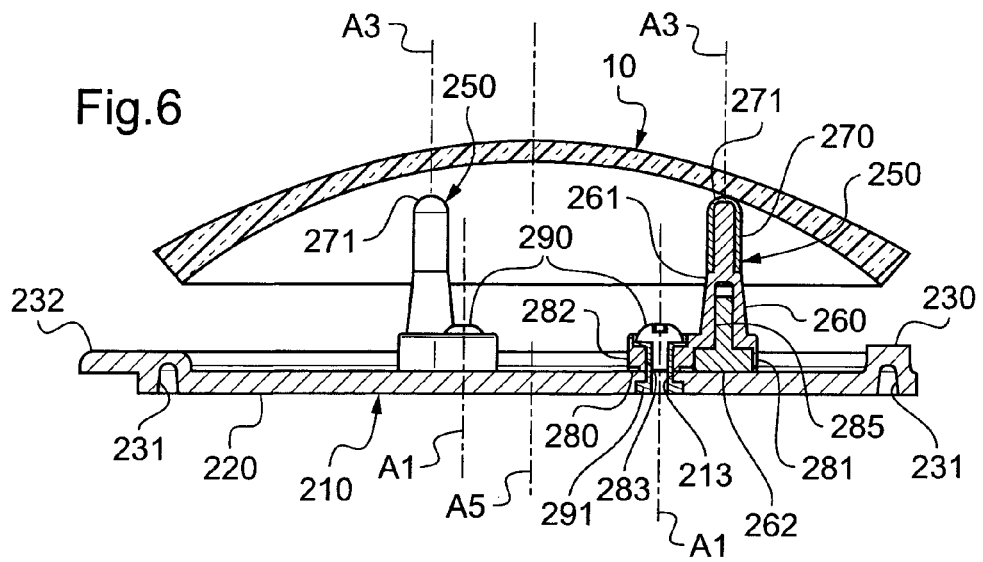
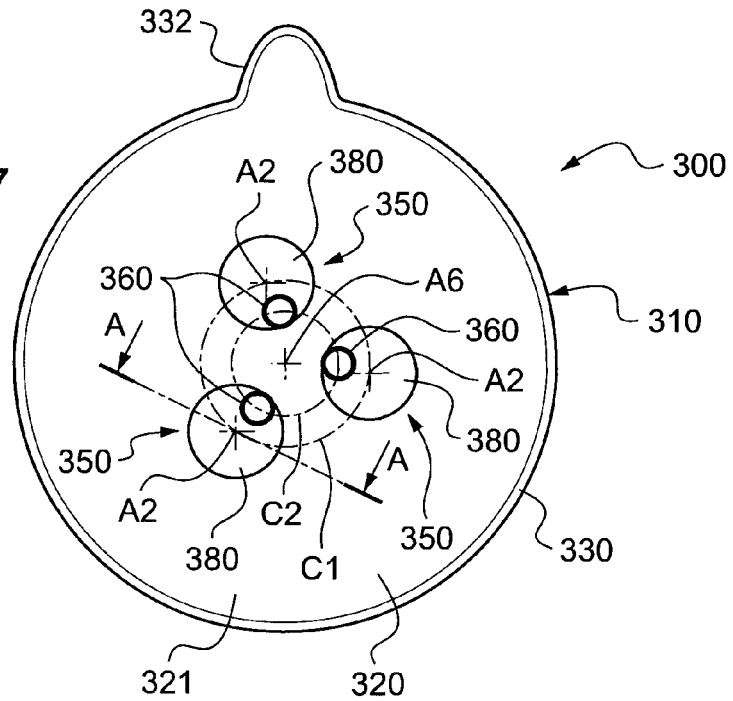
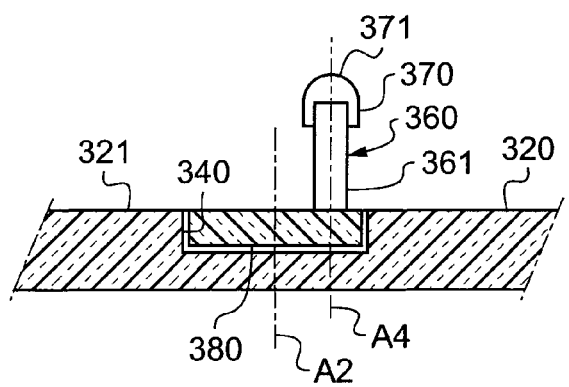

OPHTHALMIC-LENS HOLDER

TECHNICAL FIELD OF THE INVENTION

The present invention relates generally to the field of eyewear.

It relates more particularly to a holder for an ophthalmic lens, comprising a plate and three studs which project from the plate, which have free ends by way of which they are designed to support the ophthalmic lens, and at least one of which is mounted so as to be able to rotate on the plate about a rotation axis.

TECHNOLOGICAL BACKGROUND

The technical part of the optician's profession, which consists in mounting a pair of ophthalmic lenses on a spectacle frame selected by a client, is divided into four main operations:
- acquiring the shapes of the contours of the rims of the spectacle frame selected by the client,
- centering each ophthalmic lens in a centering and blocking unit, this operation consisting in determining the frame of reference of the lens with the aid of centering marks provided on the latter, then in appropriately positioning the previously acquired contour of the rim in the frame of reference of the lens such that, once it has been cut out in a manner following this contour and then mounted in its frame, the lens is correctly positioned with respect to the corresponding eye of the client in order that it carries out to the best possible extent the optical function for which it has been designed,
- blocking each lens, this operation consisting in fixing a blocking member to the lens such that the lens can be removed from the centering and blocking unit without losing the frame of reference, then
- cutting out each lens, this operation consisting in machining this lens in a manner following the previously centered contour.

During the centering and blocking operations, it is necessary to hold the lens in a fixed position.

For this purpose, a holder as mentioned above is known, the plate of which is transparent such that the lens can be centered with the aid of a conventional centering and blocking unit, and the studs of which together form a tripod on which the lens rests by way of its rear face.

This holder comprises in particular a metal base in the form of a three-point star which is fixed to the center of the transparent plate and which supports at each of its ends one of the three studs, such that the three studs are spaced in pairs 35 millimeters apart.

However, this lens holder does not prove to be entirely satisfactory both for centering the lens and for holding it in a fixed position.

Specifically, during the centering of the lens, the star-shaped base covers a part of the lens. It is thus possible for it to conceal the centering marks of the lens, with the risk that the centering and blocking unit can no longer center the lens.

Furthermore, while in the majority of cases the tripod holds the lens properly in a fixed position, sometimes it cannot correctly fulfill this function.

This is thus the case for example when the lens has already been cut out once and needs to be centered and machined a second time in order to perfectly fit the shape of the rim of the spectacle frame selected. Thus, specifically, sometimes the already cut lens has a smaller size which does not allow it to rest simultaneously on the three studs.

This is thus also the case when the lens has a very pronounced curvature and a large diameter, since there is a risk that its edge will come into contact with the transparent plate before its rear face rests on the tripod.

Furthermore, document FR2861005 discloses an ophthalmic-lens clamping jaw that can be used as a tripod for holding an ophthalmic lens.

This clamping jaw comprises three long arms mounted so as to be able to rotate on the holder about three parallel rotation axes.

The major drawback of this clamping jaw is that its arms, which are very long, cover a large part of the lens. It is thus possible for them to conceal the centering marks of the lens, with the risk that the centering and blocking unit cannot center the lens.

SUBJECT OF THE INVENTION

In order to remedy the abovementioned drawbacks of the prior art, the present invention proposes a lens holder which makes the operation of centering the lens easier and which ensures that this lens is held better.

More particularly, the invention proposes a holder as defined in the introduction, in which the free end of said stud is located at a distance of between 5 and 25 millimeters from the rotation axis of this stud.

The mobility of this stud thus makes it possible to vary the size of the tripod, between a small size for receiving already cut lenses and a large size for receiving curved lenses having large dimensions.

The mounting of each stud on the plate thus makes it possible to reduce the size of this stud such that the latter is barely visible to the centering and blocking unit and such that it does not therefore conceal the centering marks provided on the lens.

Preferably, said stud is mounted so as to be able to rotate on the plate about a rotation axis which is located at a distance from the free end of this stud.

The rotational mounting of the stud on the plate makes it possible to provide a simple and rigid connection, making it possible for the holder to perfectly accomplish its function of holding the lens in a fixed position, whatever the geometry of the latter.

Further advantageous and nonlimiting features of the holder in accordance with the invention are the following:
- the three studs are mounted so as to be able to rotate on the plate about three separate rotation axes;
- said stud is free to pivot through one complete revolution about its rotation axis;
- said stud comprises a finger in the form of a stem and a base to which the finger is fixed and which is mounted so as to be able to rotate on the plate;
- said base has an elongate shape, with a first end from which said finger projects and a second end furnished with means for rotational mounting on the plate;
- said base is in the form of a transparent disk and is mounted in a corresponding circular housing in the plate;
- said plate is transparent;
- said plate has a planar face which reflects light;
- indexing means for said stud are provided, in order to block the rotation of said stud on the plate.

DETAILED DESCRIPTION OF AN EXEMPLARY EMBODIMENT

The following description, which refers to the appended drawings, given by way of nonlimiting example, will allow the subject matter of the invention and how it can be implemented to be better understood.

In the appended drawings:

FIG. 6 is a schematic sectional view of the holder from FIG. 1 and of an ophthalmic lens resting on this holder;

FIG. 7 is a schematic top view of a variant embodiment of the holder from FIG. 1; and FIG. 8 is a sectional view along the plane A-A in FIG. 7.

FIG. 1 shows a centering and blocking unit 100.

Figures 1, 2, 3:
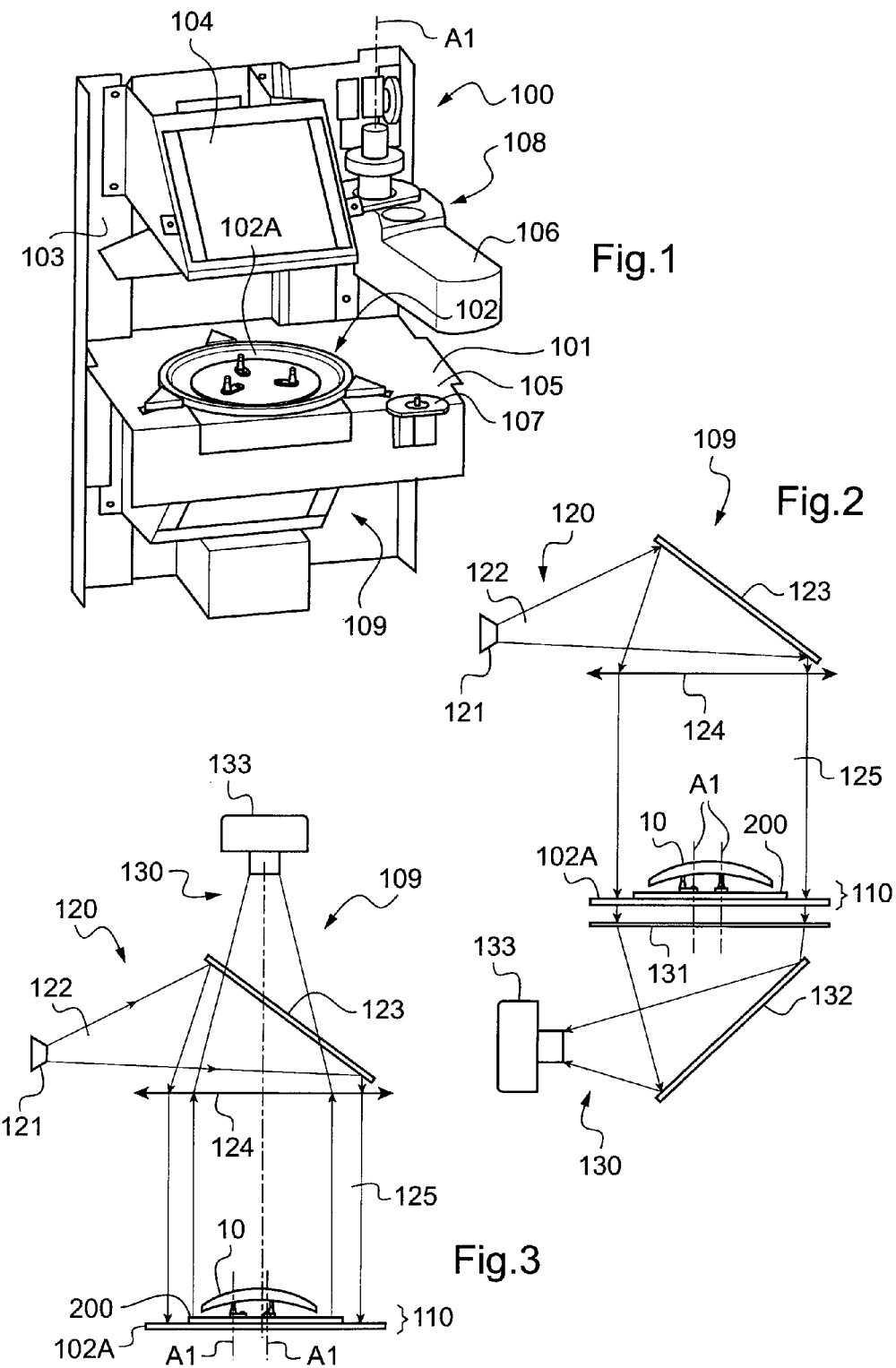
FIG. 1 is a schematic perspective view of a centering and blocking unit provided with a holder according to the invention.
FIGS. 2 and 3 are schematic plan views of two variant embodiments of the centering means of the centering and blocking unit from FIG. 1.

Such a unit is generally used by an optician after he has acquired the shapes of the contours of the rims of a spectacle frame selected by his client.

This unit is thus used to carry out centering and blocking operations for an ophthalmic lens to be mounted on this spectacle frame.

The objective of the centering operation is to identify the frame of reference of the ophthalmic lens and to determine the position which the contour of the rim is intended to occupy in this frame of reference in order that the lens, once it has been cut out in a manner following this contour and then mounted on the spectacle frame, is located in a suitably centered manner opposite the corresponding eye of the individual.

The objective of the blocking operation is to place an accessory (known as the "blocking accessory") on the ophthalmic lens, which can, on the one hand, make it easier to take hold of the lens in order to transport it from the centering and blocking unit 100 to a cutting-out unit, and, on the other hand, provide a stable reference mark for indicating the position of the frame of reference of the lens after it has been transported.

To this end, the centering and blocking unit 100 comprises:

a frame 103,
a workstation 101 fixed to the frame 103 in a horizontal plane,
a display screen 104 fixed to the frame 103 and oriented such that it is visible to the optician working at the workstation 101,
means 109 for centering the lens, said means 109 being fixed to the frame 103, and
blocking means 108 for placing a blocking accessory on the lens, said means being mounted so as to be able to move on the frame 103.

The workstation 101 comprises a horizontal plate 105 which opens onto a zone 102 for loading an ophthalmic lens.

This loading zone 102 comprises in this case a transparent and planar support plate 102A which closes off a circular opening provided in the horizontal plate 105.

For their part, the blocking means 108 comprise an operating arm 106 able to take hold of a blocking member previously placed on a receptacle 107 and to place it at a predetermined position on the front face of an ophthalmic lens.

This operating arm 106 may be semi-driven, in which case it will comprise a single form of mobility in translation in order to rise or descend in the direction of the loading zone 102, or be self-driven, in which case it will comprise three forms of mobility.

As is shown in FIG. 1, the operating arm 106 is self-driven. It thus has mobility in translation along an axis A1 in order to rise or descend in the direction of the loading zone 102, mobility in rotation about this axis A1 in order to move away from or toward the loading zone 102, and mobility in radial translation with respect to this axis A1.

The means 109 for centering the ophthalmic lens are, for their part, designed to determine the position of the frame of reference of the ophthalmic lens by marking the position and orientation of various centering marks painted on the front face of the ophthalmic lens.

As is shown in FIG. 2, the centering means 109 comprise means 110 for receiving the ophthalmic lens 10 and, on either side of these receiving means 110, means 120 for illuminating the ophthalmic lens 10 and means 130 for acquiring and analyzing the light transmitted through the ophthalmic lens 10.

The receiving means 110 comprise, in addition to the abovementioned support plate 102A, a holder 200 which is more specifically in this case the subject of the present invention and will be described in detail subsequently in this description.

The illuminating means 120 comprise a light source 121 which emits a diverging light beam 122, a mirror 123 inclined at 45° which reflects this diverging light beam 122, and a converging lens 124 designed to form a luminous beam 125 of parallel rays in the direction of the holder 200.

The acquisition and analysis means 130 comprise, for their part, a frosted plate 131 forming a screen, a mirror 132 inclined at 45° for reflecting the image formed on the screen, and a digital camera 133 for acquiring this image. Thus, the camera is designed to acquire an image of the ophthalmic lens 10, said image showing the contour and the centering marks of said ophthalmic lens 10.

FIG. 3 shows a variant embodiment of the centering means 109.

In this variant, the illuminating means 120 and the acquisition and analysis means 130 are located on one and the same side with respect to the receiving means 110.

For this purpose, the mirror 123 of the illuminating means 120 is a semi-reflective mirror 123 and the acquisition and analysis means 130 comprise only a camera 133 located behind this mirror 123.

Whatever the architecture of the centering and blocking unit 1, the holder 200 is designed to be supported on the support plate 102A of the workstation 101 and to hold the ophthalmic lens 10.

FIGS. 4 to 6 and 7 to 8 show two embodiments of this holder 200; 300.

As is shown in these figures, the holder 200; 300 comprises a plate 210; 310 designed to be supported on the support plate 102A of the workstation 101, and also three studs 250; 350 which project from the plate 210; 310 so as to have free ends 271; 371 by way of which they are designed to support the ophthalmic lens 10.

The three studs 250; 350 thus form a tripod on which the ophthalmic lens 10 can rest by way of its rear optical face during the centering and blocking operations.

According to a particularly advantageous feature of the invention, at least one of the three studs 250; 350 is mounted so as to be able to move on the plate 210.

Thus, it is possible to adjust the distance between the free ends 271; 371 of the studs 250; 350 depending in particular on the dimensions and the curvature of the ophthalmic lens 10.

In the two embodiments of the holder that are shown, the three studs 250; 350 are mounted so as to be able to move on the plate 210; 310.

More specifically, they are mounted so as to be able to rotate on the plate 210; 310 about three rotation axes A1; A2 which are parallel, separate and equidistant.

Figure 4:
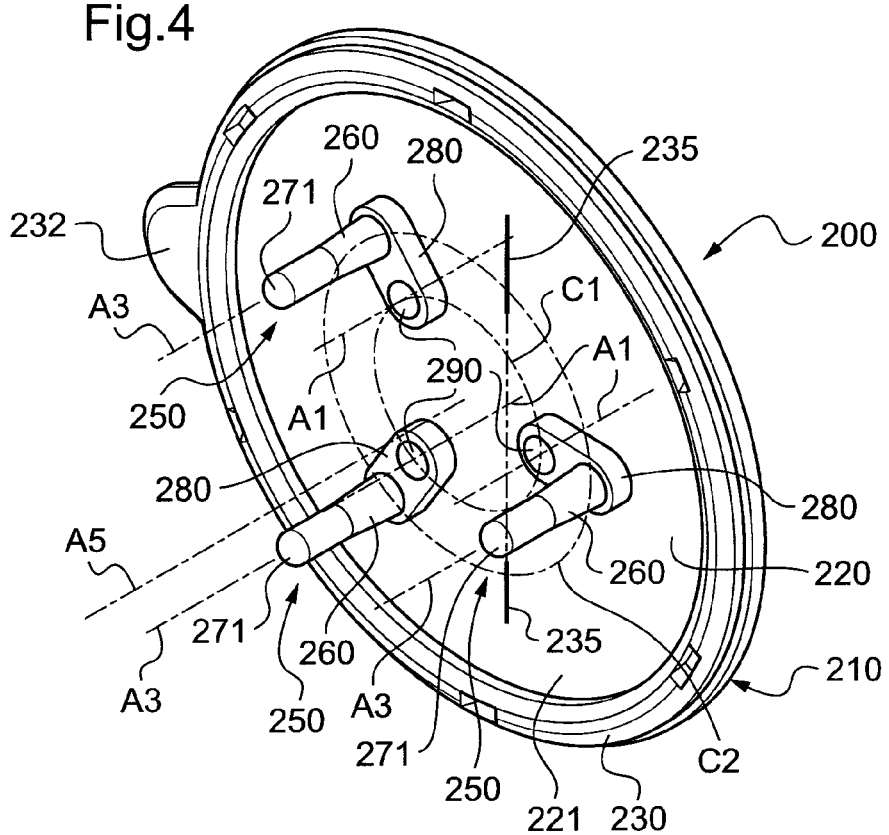
FIGS. 4 and 5 are schematic perspective views of the holder from FIG. 1, in which the protrusions are in different positions.

As FIGS. 4 and 7 show, the circle C1 circumscribed on the three rotation axes A1; A2 has a diameter which is in this case equal to 30 millimeters. The free end 271; 371 of each stud 250; 350 is furthermore located at a distance equal to 15 millimeters from the rotation axis A1; A2 of this stud 250; 350.

Consequently, the circle C2 circumscribed on the free ends 271; 371 of the three studs 250; 350 has, depending on the angular position of the studs about their rotation axes A1; A2, a diameter of between 15 and 45 millimeters.

In this way, the tripod formed by the studs of the holder 200; 300 has a variable size which can be adjusted to receive, in a stable manner, lenses having small dimensions or lenses having significant curvatures.

In the two embodiments of the holder 200; 300 that are shown in FIGS. 4 to 6 and 7 to 8, the plate 210; 310 comprises a transparent and rigid planar wall 220; 320 in the form of a disk of main axis A5; A6.

In these two embodiments, the rotation axes A1; A2 of the studs 250; 350 are parallel to this main axis A5; A6.

Each stud 250; 350 furthermore comprises a finger 260; 360 in the form of an elongate stem extending along an axis A3; A4, and a base 280; 380 to which the finger 260; 360 is fixed and which is mounted so as to be able to rotate on the plate 210; 310.

Figure 5:
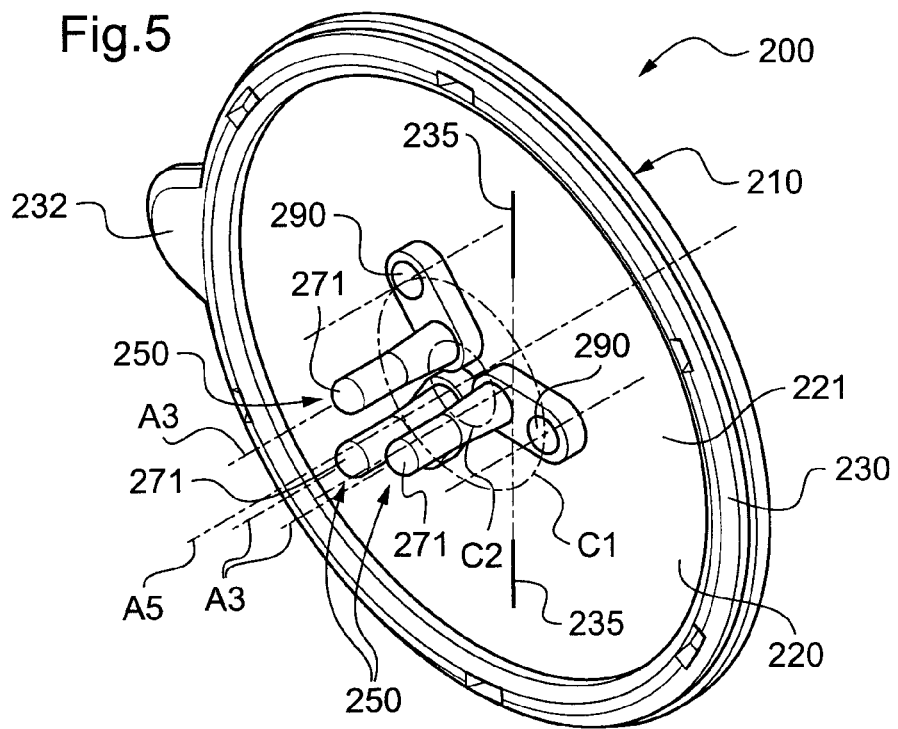

In the first embodiment of the holder 200 which is shown in FIGS. 4 to 6, the base 280 is produced from an opaque material and has an elongate shape, with a first end 281 (FIG. 6) from which the finger 260 projects and a second end 282 mounted rotationally on the plate 210.

By virtue of this elongate shape, the base 280 has a small width. Therefore, even if the studs 250 are located in the field of the image of the lens acquired by the centering means of the centering and blocking unit 100, the probability that they will cover the centering marks painted on the ophthalmic lens 10 is low.

The base 280 has more specifically in this case, when seen from below by the camera 133, an oblong shape, with a first rounded end 281 about the axis A3 and a second rounded end 282 about the rotation axis A1.

As is shown in FIG. 6, in order for the base 280 to be able to pivot on the plate 210, the base 280 and the plate 210 are pierced by two through-bores 283, 213 located in line with one another and centered on the rotation axis A1.

A tubular pin 291 is force fitted through the through-bore 213 in the plate 210 so as to be fixed to the latter. This pin 291 is, on the other hand, mounted with play in the through-bore 283 in the base 280 of the stud 250 so as to allow the stud to pivot through a complete revolution about the rotation axis A1.

In order to keep the base 280 in contact with the front face 221 of the plate 210, a locking screw 290 is screwed through the front into this pin 291, such that its head comes into slight contact with the base 280.

The finger 260 has, for its part, a frustoconical shape, having an axis of revolution A3 parallel to the rotation axis A1, the free end 271 of said finger 260 being rounded so that it does not scratch the lens.

As is shown more specifically in FIG. 6, the finger 260 has more specifically a metal body 261 which is formed in one piece with the base 280 and which is coated, at its free end, with a rubber cap 270 so that the lens is not scratched.

Recessed into its rear face, the metal body 261 furthermore has a cavity 285 which houses a sliding shoe 262 by way of which the stud 250 is supported on the front face 221 of the planar wall 220 of the plate 210. Thus, by virtue of this sliding shoe 262, the optician can easily pivot each stud 250 about its rotation axis A1, without damaging the plate 220.

In the second embodiment of the holder 300 which is shown in FIGS. 7 and 8, the base 380 has a thick and transparent disk shape and is mounted in a circular housing 340 in the plate 310. The base 380 and the plate 310 are thus preferably produced from the same material (from Plexiglas or polycarbonate).

Thus, whatever the diameter of the base 380, the latter remains invisible on the image of the lens acquired by the centering means of the centering and blocking unit 100. It thus never covers the centering marks painted on the lens.

The base 380 has more specifically in this case a disk shape having a thickness equal to half the thickness of the planar wall 320 of the plate 310, and the circular housing 340 provided in a recessed manner in the front face 321 of the planar wall 320 of the plate 310 has a shape complementary to that of the base 380, which thus has a cylindrical shape exhibiting symmetry of revolution about the rotation axis A2.

Thus, the base 380 can pivot freely in its circular housing 340 about the rotation axis A2.

As is shown more specifically in FIG. 8, the finger 360 comprises for its part a stem 361 having a cylindrical shape exhibiting symmetry of revolution about an axis of revolution A4 parallel to the rotation axis A1, and a rubber cap 370 which is fixed to the free end of the stem 361 so that it does not scratch the lens.

The stem 361 is in this case formed integrally with the base 380.

In the two embodiments of the holder 200; 300 that are shown in the figures, the plate 210; 310 comprises alignment means which make it easier to position the holder 200; 300 on the support plate 102A of the workstation 101 of the centering and blocking unit 1.

To this end, the plate 210; 310 has, around the entire periphery of its planar wall 220; 320, a bead 230; 330 which forms a lip around the front face of this planar wall 220; 320.

The alignment means thus comprise eight cavities 231 (FIG. 6) which extend in a recessed manner in the rear face of this bead 230; 330 and which are distributed regularly around the main axis A5; A6.

The alignment means also comprise a tongue 232; 332 which projects from the circular contour of the bead 230; 330, radially with respect to the main axis A5; A6. This tongue 232; 332 thus forms an error-proofing feature making it possible to identify the orientation of the plate 210; 310 about its main axis A5; A6.

The positioning of the holder 200 on the support plate 102A of the workstation 101 of the centering and blocking unit 1 thus consists in connecting the plate 210 to this support plate 102A such that, on the one hand, its cavities 231 engage with the protrusions provided in a corresponding manner on the support plate 102A and such that, on the other hand, its tongue 232; 332 is inserted into a housing provided in a corresponding manner on the support plate 102A.

Thus, the optician can ensure that the holder 200; 300 is positioned correctly in the centering and blocking unit 100.

The shape of the protrusions provided in a manner projecting from the support plate 102A is in this case provided such that the holder 200; 300, once positioned on the support plate 102A, is blocked on the latter. In this way, the ophthalmic lens 10 placed on the holder 200; 300 is held correctly in place with respect to the frame 103 of the centering and blocking unit 100 when the operating arm 106 places the blocking accessory on its front face.

Alternatively, when the operating arm 106 of the centering and blocking unit 100 is not self-driven but semi-driven, it is possible to provide for the holder not to be provided with alignment means.

Specifically, in this case, the operating arm 106 is only designed to rise or descend, such that the optician has to manually position the plate under the operating arm by sliding it onto the support plate of the workstation. The plate should thus be able to slide freely on this support plate.

In this variant, as is moreover clear from FIGS. 4 and 5, it is possible to provide for two orientation lines 235 to be painted on the front face 221 of the planar wall 220 of the plate 210 to make it easier to identify this plate.

In the embodiment of the holder 200; 300 which is shown in the figures, the plate 210; 310 is transparent so that the camera 133 of the centering means shown in FIG. 2 can acquire an image of the ophthalmic lens 10.

In the variant shown in FIG. 3, where the camera 133 and the light source 121 are placed on the same side with respect to the holder 200, it is possible to provide for the front face 221; 321 or the rear face of the planar wall 220; 320 of the plate 210; 310 of the holder 200; 300 to be reflective, so as to allow the camera 133 to acquire an exposure of the image of the lens which is reflected from this planar wall.

The present invention is in no way limited to the embodiments described and shown, and a person skilled in the art will be able to envision many variants.

In particular, provision can be made for the rotation axis of each stud to extend not perpendicularly to the planar wall of the plate but along an axis inclined with respect to said wall.

The stud could thus be inclined on the plate such that the size of its image on the image acquired by the camera will be reduced.

According to a variant of the holder which is shown in FIGS. 4 to 6, provision could be made for the finger of each stud to extend not parallel to the rotation axis of the stud but along an axis inclined with respect to this rotation axis.

In this way, a base having a reduced length could be provided for each stud.

As a further variant, provision could be made of electromagnetic means for controlling the angular position of the studs, so that the optician is not forced to manually adjust the angular position of the studs on the plate. Provision could thus be made to furnish the base of each stud of the holder with a magnet, and to furnish the workstation of the centering and blocking unit with means for controlling the position of these magnets.

In this way, the angular position of the studs could be adjusted remotely.

According to another variant of the invention, provision could be made for two of the three studs to be fixed to the plate and for the third stud to be mounted so as to be able to move in translation in a groove or on a rib of the plate, having a length of between 5 and 30 millimeters.

In this way, the size of the image of the stud on the image acquired by the camera will be minimized. The size of the image of the rib or the groove on the image acquired by the camera will also be reduced.

According to another variant of the invention which is not shown in the figures, provision could be made of indexing (or notching) means for each of the studs which is mounted rotationally on the plate, in order to block the rotation of the studs in one or more angular positions about their rotation axis.

Provision could in particular be made for them to block each stud in six angular positions that are spaced apart in pairs through 60° about its rotation axis.

Typically, these indexing means could be in the form of six protrusions projecting from the plate, said protrusions being distributed regularly about the rotation axis of the stud in question, and being designed to engage with a hollow provided in a corresponding manner at the bottom of the stud.

These notching means could also be formed by six flats distributed regularly over the lateral face of the screw which connects the stud to the plate, it being possible for each of these flats to form a stop.

The invention claimed is:

1. A holder for an ophthalmic lens, comprising:
   a plate, and
   three studs which are mounted on the plate, the three studs projecting from the plate so as to have free ends by way of which the three studs are designed to support the ophthalmic lens, and at least one of the three studs is mounted so as to be able to rotate on the plate about a rotation axis,
   wherein the free end of said at least one stud is located at a distance of between 5 and 25 millimeters from the rotation axis of the at least one stud, and
   wherein the at least one stud (250) is free to pivot through one complete revolution about the rotation axis (A1),
   wherein said at least one stud comprises a finger in the form of a stem, and a base to which the finger is fixed and which is mounted so as to be able to rotate on the plate, and
   wherein said base is in the form of a transparent disk and is mounted in a corresponding circular housing in the plate.

2. The holder as claimed in claim 1, in which the three studs are mounted so as to be able to rotate on the plate about three separate rotation axes.

3. The holder as claimed in claim 1, in which said plate is transparent.

4. The holder as claimed in claim 1, in which said plate has a planar face which reflects light.

5. The holder as claimed in claim 1, wherein,
   each of the three studs is rotatable on the plate about a different respective rotation axis,
   a longitudinal axis of each said stud is located at a offset distance from the respective rotation axis of each said stud, and
   each said stud is free to pivot through one complete revolution, at the offset distance, about the rotation axis of each said stud so that each said stud may occupy any angular position around the respective rotation axis of each said stud.

6. The holder as claimed in claim 1, wherein,
   each of the three studs is rotatable on the plate about a different respective rotation axis, and a longitudinal axis of each said stud is located at a offset distance from the respective rotation axis of each said stud.

7. The holder as claimed in claim 1, wherein, each of the three studs is rotatable on the plate about a different respective rotation axis, and a longitudinal axis of each said stud is located at a offset distance from the respective rotation axis of each said stud, and each said stud is free to pivot through one complete revolution at the offset distance about the rotation axis of each said stud thereby to thereby vary distances between the three studs.

8. The holder as claimed in claim 7, wherein, the studs are pivotable about the different respective rotation axis to vary a diameter of a circle (C2) circumscribed on the free ends of the three studs between 15 and 45 millimeters.

9. The holder as claimed in claim 1, wherein, each of the three studs is mounted on a different respective base at an offset distance from the respective rotation axis of each said stud, the base of each of the studs is pivotably mounted to the plate about the different respective rotation axis of each stud, and rotation of each base about the respective rotation axis of each stud pivots each said stud through one complete revolution at the offset distance about the rotation axis of each said stud.

10. The holder as claimed in claim 1, wherein, each of the three studs is mounted on a different respective base at an offset distance from the respective rotation axis of each said stud, the base of each of the studs is pivotably mounted to the plate about the different respective rotation axis of each stud, and each base is rotatable about the respective rotation axis of each stud to thereby pivot each said stud through one complete revolution at the offset distance about the rotation axis of each said stud to thereby vary distances between the three studs and to vary a diameter of a circle (C2) circumscribed on the free ends of the three studs.

11. The holder as claimed in claim 10, wherein each base is comprised of a finger mounted on an upper surface of the plate and at the respective rotation axis of each said stud, the finger being rotatable about the respective rotation axis of each said stud.

12. The holder as claimed in claim 10, wherein each base is comprised of a disk mounted in a circular recessed housing in an upper surface of the plate, each said disk pivoting freely in the circular recessed housing about the rotation axis of each said stud.

13. The holder as claimed in claim 10, wherein, the studs are pivotable about the different respective rotation axis to vary the diameter of a circle (C2) circumscribed on the free ends of the three studs between 15 and 45 millimeters.

14. The holder as claimed in claim 1, wherein the finger protrudes rectilinearly from the disk.

* * * * *